(12) United States Patent
Slutsky et al.

(10) Patent No.: US 11,127,119 B1
(45) Date of Patent: Sep. 21, 2021

(54) SYSTEMS AND METHODS FOR IMAGE DEBLURRING IN A VEHICLE

(71) Applicant: GM GLOBAL TECHNOLOGY OPERATIONS LLC, Detroit, MI (US)

(72) Inventors: Michael Slutsky, Kfar Saba (IL); Tzvi Philipp, Bet Shemesh (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 16/821,081

(22) Filed: Mar. 17, 2020

(51) Int. Cl.
*G06T 5/00* (2006.01)
*G06T 5/50* (2006.01)

(52) U.S. Cl.
CPC ............... *G06T 5/003* (2013.01); *G06T 5/50* (2013.01); *G06T 2207/20201* (2013.01)

(58) Field of Classification Search
CPC .. G06T 5/003; G06T 5/50; G06T 2207/20201
See application file for complete search history.

(56) References Cited

U.S. PATENT DOCUMENTS 9,406,108 B2 * 8/2016 Salvador ................. G06T 5/003
2018/0343432 A1 * 11/2018 Duan ...................... G06T 5/003

OTHER PUBLICATIONS

Li Xu and Jiaya Jia, "Depth-aware motion deblurring," 2012 IEEE International Conference on Computational Photography (ICCP), 2012, pp. 1-8, doi: 10.1109/ICCPhot.2012.6215220. (Year: 2012).*

* cited by examiner

*Primary Examiner* — Phuoc Tran
(74) *Attorney, Agent, or Firm* — Lorenz & Kopf LLP (57) ABSTRACT

Method and systems for image deblurring in a vehicle. The methods and systems include determining a point spread function based on vehicle motion data and a depth map received from vehicle motion sensors and a depth sensor. A deblur matrix is calculated based on the point spread function. A blurred input image, received from an imaging device, is deblurred based on the deblur matrix to thereby provide a deblurred output image. A function of the vehicle is controlled based on the deblurred output image.

20 Claims, 7 Drawing Sheets

SYSTEMS AND METHODS FOR IMAGE DEBLURRING IN A VEHICLE

TECHNICAL FIELD

The present disclosure generally relates to non-blind image deblurring in a vehicle, and more particularly relates to methods and systems for removing motion induced blur from images captured by an imaging device of a vehicle.

An image captured by a camera may be blurred for a variety of reasons. For example, the camera may have been moving or shaking during image capture. Image blur may also be caused by optical aberrations. Chromatic blur is also prevalent by which different wavelengths are refracted to different extents. Non-blind deconvolution techniques are known by which a blurred input image is processed in order to obtain a clearer, deblurred, output image. According to such deconvolution techniques, a blur matrix is utilized to transform the blurred input image to a deblurred output image. The blur matrix may be determined from a point spread function representing the nature of anticipated blurring effects. In the case of a camera mounted to a moving vehicle, the point spread function is derived based on knowledge of the vehicle motion and the deblurring kernel is determined based on the point spread function. That is, a blur source is often well known in imaging and the blurring process can be modeled quite well using a point spread function (PSF) that is directly measured or derived from knowledge of the physics of blurring.

Motion induced blur is a common artifact affecting performance of perception, localization, and other algorithms in various applications including automated vehicle systems. Motion blur appears when the imaging device is in motion relative to a real world scene being captured, particularly when camera exposure time is raised. Exposure time may be extended in order to improve signal to rise ratio of the captured image, such as in low lighting conditions.

Optical flow is the pattern of apparent motion of objects, surfaces, and edges in a visual scene caused by the relative motion between an imaging device and a scene. Optical flow is representative of motion blurring that will be included in a captured image of the scene. Motion induced blur has proven difficult to model by an appropriate PSF for a variety of reasons. In vehicular contexts, whilst vehicle motion is known, motion blur as a result of that vehicle motion is not the same for all objects in the real word scene.

Accordingly, it is desirable to provide systems and methods that can deblur motion induced blurring accurately and efficiently in terms of processing resources. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method of image deblurring in a vehicle is provided. The method includes receiving, via a processor, a blurred input image from an imaging device, vehicle motion data from one or more vehicle motion sensors, and a a depth map corresponding to the blurred input image from a depth sensor. The processor determines a point spread function based on the vehicle motion data and the depth map, calculates a deblur matrix based on the point spread function, and deblurs the blurred input image based on the deblur matrix and the blurred input image to thereby provide a deblurred output image. A function of the vehicle is controlled based on the deblurred output image.

In embodiments, the method includes calculating a blur matrix based on the point spread function and calculating a regularized deblur matrix, which corresponds to the deblur matrix, based on the blur matrix and using a deconvolution function. In one embodiment, the deconvolution function is a Tikhonov-regularized deconvolution function.

In embodiments, the point spread function represents a smear extent in image space of each pixel of the blurred input image caused by motion of a real world scene relative to the imaging device as a result of vehicle motion. Each pixel in two dimensional image space of the blurred input image has one or more corresponding locations in the real world scene. The vehicle motion is defined by the vehicle motion data. The smear extent in image space of each pixel of the blurred input image is inversely proportional to depth of the one or more corresponding locations in real world space. The depth in real world space is defined by the depth map.

In one embodiment, the imaging device is a side looking camera of the vehicle. The method includes, in the case of translational vehicle motion, the following processor steps: estimating a magnitude of optical flow lines based on the depth map and the vehicle motion data; determining the point spread function based on the magnitude of the optical flow lines; calculating a blur matrix based on the point spread function; calculating a regularized deblur matrix based on the blur matrix and using a deconvolution function; and deblurring the blurred input image based on the regularized deblur matrix and the blurred input image to thereby provide the deblurred output image.

In one embodiment, the imaging device is a forward looking or rearward looking camera of the vehicle. The method includes, in the case of translational vehicle motion, the following processor steps: resampling the blurred input image and the depth map to polar coordinates converging at a focus of expansion of the imaging device; estimating a magnitude of the optical flow lines based on the resampled depth map and the vehicle motion data; determining the point spread function based on the magnitude of the optical flow lines; calculating a blur matrix based on the point spread function; calculating a regularized deblur matrix based on the blur matrix and using a deconvolution function; deblurring the blurred input image based on the regularized deblur matrix and the resampled blurred input image to thereby provide a polar coordinates deblurred image; and resampling the polar coordinates deblurred image into cartesian coordinates to thereby provide the deblurred output image.

In one embodiment, the method includes estimating, via the processor, magnitude and direction of optical flow lines in cartesian coordinates based on the depth map and the vehicle motion, thereby estimating optical flow. The optical flow is resampled from the cartesian coordinates along the optical flow lines. The blurred input image is resampled from cartesian coordinates along the optical flow lines. The point spread function is determined based on the vehicle motion and the resampled optical flow. A blur matrix is calculated based on the point spread function. A regularized deblur matrix is calculated based on the blur matrix and using a deconvolution function. The method includes deblurring, via the processor, the blurred input image based on the regularized deblur matrix and the resampled blurred input image to thereby provide an optical flow coordinates deblurred image. The optical flow coordinates deblurred image is resampled into cartesian coordinates to thereby provide the deblurred output image.

In embodiments, the steps of determining the point spread function, calculating the deblur matrix, and deblurring the blurred input image are performed on a single row and for each row of the blurred input image.

In another embodiment, a system for image deblurring in a vehicle is provided. The system includes an imaging device, a vehicle controller, a depth sensor, and a processor configured to execute program instructions. The program instructions are configured to cause the processor to receive a blurred input image from the imaging device, receive vehicle motion data, receive a depth map corresponding to the blurred input image from the depth sensor, determine a point spread function based on the vehicle motion data and the depth map, calculate a deblur matrix based on the point spread function, and deblur the blurred input image based on the deblur matrix and the blurred input image to thereby provide a deblurred output image. The vehicle controller is configured to control a function of the vehicle based on the deblurred output image.

In embodiments, the program instructions are configured to cause the processor to calculate a blur matrix based on the point spread function and calculate a regularized deblur matrix, which corresponds to the deblur matrix, based on the blur matrix and using a deconvolution function. In one embodiment, the deconvolution function is a Tikhonov-regularized deconvolution function.

In embodiments, the point spread function represents a smear extent in image space of each pixel of the blurred input image caused by motion of a real world scene relative to the imaging device as a result of vehicle motion. Each pixel in two dimensional image space of the blurred input image has one or more corresponding locations in the real world scene. The vehicle motion is defined by the vehicle motion data. The smear extent in image space of each pixel of the blurred input image is inversely proportional to depth of the one or more corresponding locations in real world space. The depth in real world space is defined by the depth map.

In one embodiment, the imaging device is a side looking camera of the vehicle. The program instructions are configured to cause the processor to, in the case of translational vehicle motion perform the following steps: estimate magnitude of optical flow lines based on the depth map and the vehicle motion data; determine the point spread function based on the magnitude of the optical flow lines; calculate a blur matrix based on the point spread function; calculate a regularized deblur matrix based on the blur matrix and using a deconvolution function; and deblur the blurred input image based on the regularized deblur matrix and the blurred input image to thereby provide the deblurred output image.

In one embodiment, the imaging device is a forward looking or rearward looking camera of the vehicle. The program instructions are configured to cause the processor to, in the case of translational vehicle motion, perform the following steps: resample the blurred input image and the depth map to polar coordinates converging at a focus of expansion of the imaging device; estimate optical flow lines based on the resampled depth map and the vehicle motion data; determine the point spread function based on the magnitude of the optical flow lines; calculate a blur matrix based on the point spread function; calculate a regularized deblur matrix based on the blur matrix and using a deconvolution function; deblur the blurred input image based on the regularized deblur matrix and the resampled blurred input image to thereby provide a polar coordinates deblurred image; and resample the polar coordinates deblurred image into cartesian coordinates to thereby provide the deblurred output image.

In an embodiment, the program instructions are configured to cause the processor to: estimate magnitude and direction of optical flow lines in cartesian coordinates based on the depth map and the vehicle motion, thereby estimating optical flow; resample the optical flow from the cartesian coordinates along the optical flow lines; resample the blurred input image from cartesian coordinates along the optical flow lines; determine the point spread function based on the vehicle motion and the resampled optical flow; calculate a blur matrix based on the point spread function; calculate a regularized deblur matrix based on the blur matrix and using a deconvolution function; deblur the blurred input image based on the regularized deblur matrix and the resampled blurred input image to thereby provide an optical flow coordinates deblurred image; and resample the optical flow coordinates deblurred image into cartesian coordinates to thereby provide the deblurred output image.

In embodiments, the steps of determining the point spread function, calculating the deblur matrix, and deblurring the blurred input image are performed on a single row and for each row of the blurred input image.

In another embodiment, there is provided a vehicle. The vehicle includes an imaging device; a vehicle controller; vehicle actuators; a depth sensor; one or more vehicle motion sensors; and a processor configured to execute program instructions. The program instructions are configured to cause the processor to: receive a blurred input image from the imaging device; receive vehicle motion data from one or more vehicle motion sensors; receive a depth map corresponding to the blurred input image from the depth sensor; determine a point spread function based on the vehicle motion data and the depth map; calculate a deblur matrix based on the point spread function; and deblur the blurred input image based on the deblur matrix and the blurred input image to thereby provide a deblurred output image. The vehicle controller is configured to control a function of the vehicle, via the vehicle actuators, based on the deblurred output image.

In embodiments, the program instructions are configured to cause the processor to calculate a blur matrix based on the point spread function and calculate a regularized deblur matrix, which corresponds to the deblur matrix, based on the blur matrix and using a deconvolution function.

In embodiments, the program instructions are configured to cause the processor to: estimate magnitude and direction of optical flow lines in cartesian coordinates based on the depth map and the vehicle motion, thereby estimating optical flow; resample the optical flow from the cartesian coordinates along the optical flow lines; resample the blurred input image from cartesian coordinates along the optical flow lines; determine the point spread function based on the vehicle motion and the resampled optical flow; calculate a blur matrix based on the point spread function; calculate a regularized deblur matrix based on the blur matrix and using a deconvolution function; deblur the blurred input image based on the regularized deblur matrix and the resampled blurred input image to thereby provide an optical flow coordinates deblurred image; and resample the optical flow coordinates deblurred image into cartesian coordinates to thereby provide the deblurred output image.

In embodiments, the steps of determining the point spread function, calculating the deblur matrix, and deblurring the blurred input image are performed on a single row and for each row of the blurred input image.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Described herein are systems and methods for motion blur removal in which a depth map from one or more depth sensors is leveraged to estimate optical flow in an image captured by an imaging device. The depth map provides depth information for features captured in the image, thereby allowing at least a magnitude of optical flow to be estimated such that accurate motion artifact deblurring can proceed. The deblurring systems and methods disclosed herein are partly predicated on appreciating that motion induced blur is dependent on image depth. An object closer to the imaging device will move more (have a larger magnitude of optical flow) in image space during exposure than an object farther away. The farther away object will thus suffer from lower optical flow or motion blur. Systems and methods described herein take into account depth information for a captured image so as to execute depth variable motion deblurring processes. In some embodiments described herein, blurred input images are fed into a deconvolution algorithm. The deconvolution algorithm uses a depth dependent point spread function (PSF) based on the depth map. In some embodiments, the blurred input images are resampled along optical flow lines prior to deconvolution.

In embodiments described herein, the imaging device is mounted to a vehicle. The deblurred output image is used by autonomous vehicle (AV) systems and/or advanced driver assistance systems (ADAS) as part of a vehicle controller. Since the deblurred output images will be clearer than in present systems, the vehicle controller can make decisions based on better source information, potentially allowing safer operation.

Figure 1:
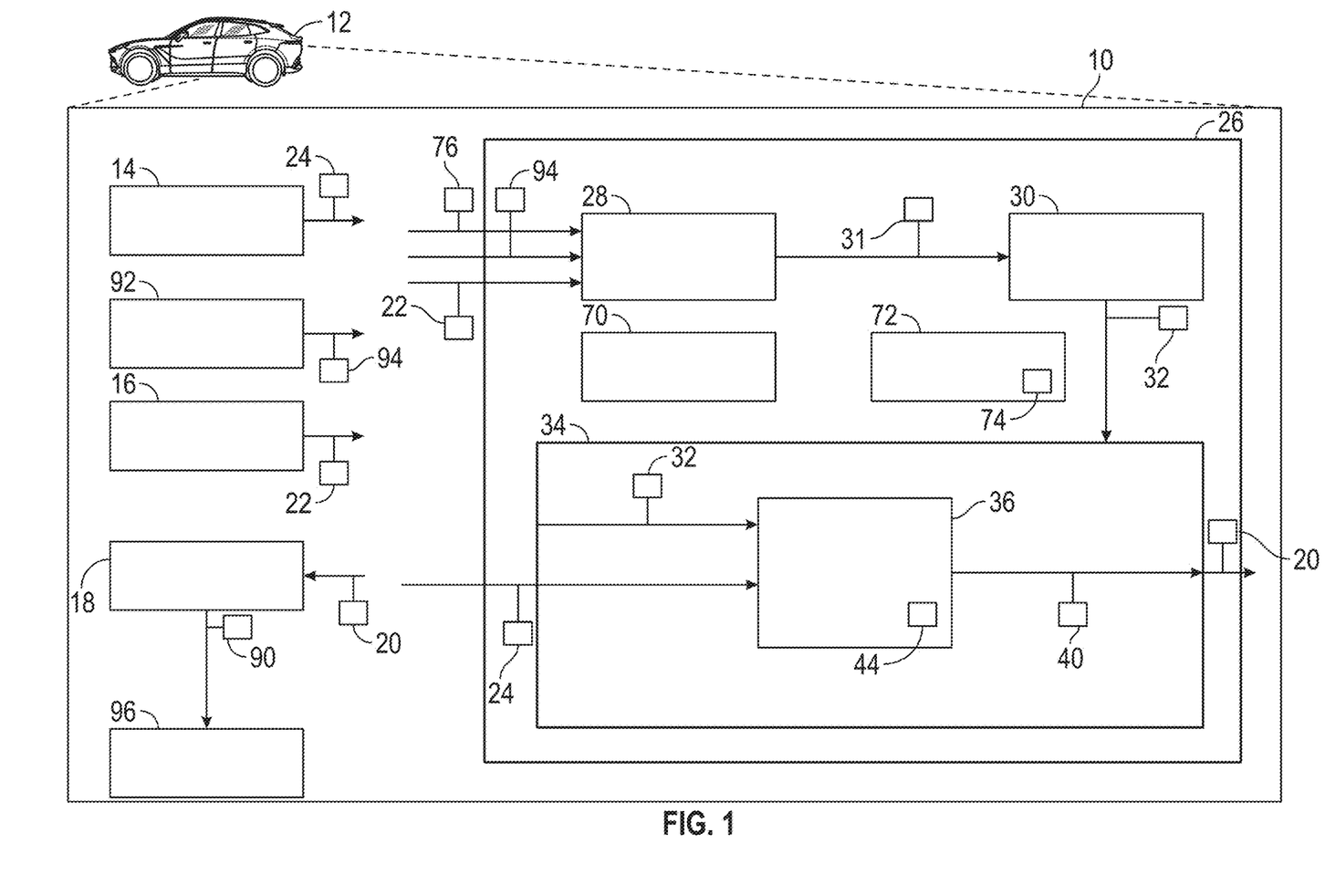
FIG. 1 is a functional block diagram of a system for non-blind image deblurring, in accordance with an exemplary embodiment.

FIG. 1 illustrates a system 10 for image deblurring (non-blind). The system 10 includes a vehicle 12, an imaging device 14 mounted to the vehicle 12, vehicle motion sensors 16, one or more depth sensors 92, a vehicle controller 18, vehicle actuators 96 and an image processing system 26.

The system 10 is shown in the context of (e.g. included within) a vehicle 12, specifically an automobile. The system 10, however, is useful in other vehicular contexts such as aircraft, sea vessels, etc. The system 10 is applicable outside of vehicular contexts including any electronic device, such as a mobile telephone, a camera, and a tablet device, that captures an image subject to motion induced blurring. The present disclosure is particularly, but not exclusively, relevant to blurring as a result of motion of the vehicle 12 at night or other times when exposure times are extended.

In various embodiments, the vehicle 12 is an autonomous vehicle and the system 10 is incorporated into the autonomous vehicle 12. However, the system 10 is useful in any kind of vehicle (autonomous or otherwise) that includes an imaging device 14 that produces images subject to motion induced blurring. The autonomous vehicle 12 is, for example, a vehicle that is automatically controlled to carry passengers from one location to another. The vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 12 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

In embodiments, the vehicle 12 includes a vehicle controller 18 that controls one or more vehicular functions based on images from an imaging device 14. The vehicle controller 18 may include one or more advanced driver-assistance systems providing electronic driver assistance based on images from the imaging device 14. The vehicle controller 18 may include an autonomous driver or semi-autonomous driver controlling the vehicle 12 through one or more vehicle actuators 96 (e.g. actuators of propulsion, braking and steering systems) based on images input from the imaging device 14. In embodiments, the vehicle controller 18 includes control modules receiving deblurred output images 20 (e.g. as frames of a video or as still images) from image processing system 26 in order to determine control instructions 90 to be applied to the vehicle actuators 96. The control modules of the vehicle controller 18 may run localization and environmental perception algorithms that process the deblurred output images 20 in order to determine the control instructions 90. The deblurred output images 20 have ego-motion induced blurring removed or largely ameliorated by using a deblur matrix that has been calculated to take into account vehicle motion, exposure time and depth information for a given input image, as will be described further herein. In all such embodiments, better deblurred images will allow the vehicle controller 18 to more safely control the vehicle 12.

In accordance with various embodiments, system 10 includes the imaging device 14 (e.g. a front, rear or side mounted camera) or a plurality of such imaging devices 14. The imaging device 14 is any suitable camera or video device that produces images. Images are presumed to include blurring (and thus are labelled blurred input images 24) for the purposes of the present disclosure as a result of motion blurring cause by relative motion between a real world scene and the imaging device 14 as a result of motion of the vehicle 12. The imaging device 14 may be a color imaging device or a grayscale imaging device. The imaging device 14 may operate in visible and/or infrared spectrums. The imaging device 14 may produce one, two or three-dimensional (1D, 2D or 3D) images serving as blurred input images 24.

The vehicle motion sensors 16 include a variety of sensors used by vehicle controller 18 in order to control operation of vehicle 12. Of particular relevance to the present disclosure are speed sensors, e.g. wheel speed sensors, acceleration sensors, e.g. accelerometers and/or gyroscopes, and other vehicle motion sensors 16 that provide vehicle motion data 22 representing sensed parameters of vehicle motion. The vehicle motion data 22 is used by image processing system 26 in order to determine a PSF, as described further herein. In some embodiments, vehicle motion data 22 can be estimated from other data sources rather than being directly sensed. For example, vehicle motion data 22 can be estimated based on perception capabilities of the vehicle 12.

The one or more depth sensors 92 provide a depth channel for the blurred input images 24 such that three dimensional position information for features in the blurred input images is available. The depth sensor 92 thus produces a depth map 94 corresponding to the blurred input image 24. The depth sensor 92 can be any of a variety of kinds including a stereo camera system, a lidar device, a time-of-flight (TOF) camera, a radar device, an ultrasound device, and a laser range finder, and can be associated with suitable processing capability to allow depth or range information to be obtained. Although the depth sensor 92 and the imaging device 14 are shown as separate devices in FIG. 1, they may be integrated devices such as with an intensified CCD camera.

Continuing to refer to FIG. 1, the image processing system 26 includes at least one processor 70, a memory 72, and the like. The processor 70 may execute program instructions 74 stored in the memory 74. The processor 70 may refer to a central processing unit (CPU), a graphics processing unit (GPU), or a dedicated processor on which the methods and functions according to the present disclosure are performed. The memory 72 may be composed of a volatile storage medium and/or a non-volatile storage medium. For example, the memory 72 may be comprised of a read only memory (ROM) and/or a random access memory (RAM). The memory 72 stores at least one instruction executed by the processor 70 in order to implement blocks, modules and method steps described herein. The modules implemented by the image processing system 26 include a point spread function (PSF) module 28, a blur matrix calculation module 30, a deblurring module 34 and a regularized deconvolution sub-module 36. Although the modules 28, 30, 34 and 36 (described further hereinafter) are shown separately from the processor 70, the memory 72 and the programming instructions 74, this is purely for visualization. In reality, the modules 28, 30, 34 and 36 are embodied by the programming instructions 74 stored on the memory 74 and executable by the one or more processors 70 of the image processing system 26.

The image processing system 26 is configured, by the programming instructions 74 executing on the processor 70 (as described further below), to receive the blurred input image 24 from the imaging device 14, to receive the depth map 94 from the one or more depth sensors 92 and to receive vehicle motion data 22 from the vehicle motion sensor(s) 16. The image processing system 26 determines a PSF based not only on the vehicle motion data 22 (e.g. moving speed) and camera data 76 (e.g. exposure time), but also on depth information for the blurred input image 24 so as to allow for the fact that farther away objects have a lesser amount of motion induced blur than closer objects. The image processing system 26 calculates a deblur matrix based on the point spread function through a deconvolution process. By operation of the deblur matrix on the blurred input image 24, the image processing system 26 provides the deblurred output image 20.

Blurring of an input image can be represented mathematically by the following equation:

$$I_B = I \times K_B \quad \text{(equation 1)}$$

where $I_B$ is the blurred input image 24, I is an unknown, unblurred image corresponding to the deblurred output image 20 and $K_B$ is a blur matrix that models a PSF describing the nature of the blurring in the blurred input image 24. Since the present disclosure is concerned with non-blind deblurring, it is assumed that the PSF is known and thus the blur matrix $K_B$ can be derived from the PSF. PSFs for all manner of blurring are known in the art including blurring caused by motion of the imaging device 14 during exposure. In theory, the inverse of the blur matrix (the inverse being represented by $K_B^{-1}$) can be multiplied with the blurred input image 24 to resolve the unblurred image I. However, noise in the blurred input image 24 makes such a straightforward deconvolution impractical. The noise component will be amplified during the deconvolution process in an uncontrolled way, likely leading to deconvolved images that are less clear (or more blurred) than the original blurred input image 24. One solution to this noise amplification problem is to use a regularized inverse of the blur matrix to deblur the blurred input image 24. Such regularized deconvolution functions are known in the art. Regularized deconvolution functions rely on a regularization parameter $\lambda$ to mitigate the effects of noise. Referring to FIG. 1, the regularization deconvolution sub-module 36 receives the blurred input image 24 and operates a regularized deconvolution function 44 thereon.

The image processing system 26 includes the PSF module 28, which receives vehicle motion data 22 including at least speed data and receives depth map data 94. These inputs are processed by the PSF module 28 to determine PSF data 31 representing a PSF function. During the course of operation of the PSF module 28, optical flow lines are implicitly or explicitly estimated, as will be described further herein. PSF data 31 is variable depending upon vehicle motion (e.g. the faster the vehicle, the greater the spread or blur defined by the PSF) and camera data 76 representing relevant camera parameters obtained from imaging device 14 (e.g. exposure time, whereby the longer the exposure, the greater the blur assuming constant vehicle speed). The PSF data 31 is determined by the point spread function module 28, which includes an optical flow modelling function for determining anticipated PSF based on the vehicle motion data 22 and the camera data 76. In one embodiment, the point spread function module 28 determines PSF data 31, assuming translational motion of the vehicle 12 with the imaging device 14 pointing in a direction perpendicular to the velocity vector (side-looking imaging device 14), based on:

$$\begin{pmatrix} u(t) \\ v \end{pmatrix} = \frac{f}{Z} \begin{pmatrix} X + Vt \\ Y \end{pmatrix} \quad \text{(equation 2)}$$

where u and v are coordinates in two dimensional image space, X, Y and Z are coordinates in three dimensional, real world space, f is a focal length of the imaging device 14 and is predetermined for a particular system 10, V is the speed of the vehicle 12, which is derived from the vehicle motion data 22 and t corresponds to the exposure time of the imaging device 14, which is derived from the camera data 76. Assuming translational motion of the vehicle 12 with the imaging device 14 pointing in a direction perpendicular to the velocity vector (side-looking imaging device 14), the expected smear occurs only along the u axis and the expected smear extent is:

$$\delta u = f \frac{Vt}{D(u, v)} \quad \text{(equation 3)}$$

where D is the depth map defined in the depth map data 94:

$$D(u,v) = Z(u(X), v(Y)) \quad \text{(equation 4)}$$

Optical flow is the pattern of apparent motion of objects, surfaces, and edges in an image scene caused by the relative motion between the imaging device 14 and the real world scene. In the example of translation motional in a y direction and an x direction looking imaging device 14, optical flow lines occur in one dimension only —along the u direction in image space, which corresponds to the x direction in real world space. As such, optical flow lines are estimated by equation 3. The PSF module defines the PSF data 31 based on the optical flow lines that are implicitly estimated according to equation 3.

As will be understood from equations 2 and 3, the amount of movement of the image in image space during the exposure time is inversely proportion to a depth of the imaged object in real world space. The present disclosure proposes to factor in depth information using the depth map data 94 when determining the PSF data 31, thereby determining a depth adaptive point spread function allowing accurate motion artifact deblurring.

The blur matrix calculation module 30 transforms the PSF defined in PSF data 31 into matrix form and outputs the corresponding blur matrix 32. The blur matrix 32 can take the form:

$$K_B^{(i)}[m, n] = \begin{cases} PSF[m, n] = \frac{1}{L} & n \leq m \leq n + L - 1 \\ 0 & \text{otherwise} \end{cases} \quad \text{(equation 5)}$$

The PSF in equation 5 is obtained from the PSF data 31, wherein L is derived from equation 3 as follows:

$$L = \left\lceil f \frac{VT}{\langle D(m, n) \rangle} \right\rceil \quad \text{(equation 6)}$$

The regularized deconvolution sub-module 36 receives the blur matrix 32 representing blur matrix $K_B$ and to makes use thereof in carrying out a regularized deconvolution on blurred input image 24 in order to generate deconvolved image 40.

Figure 2:
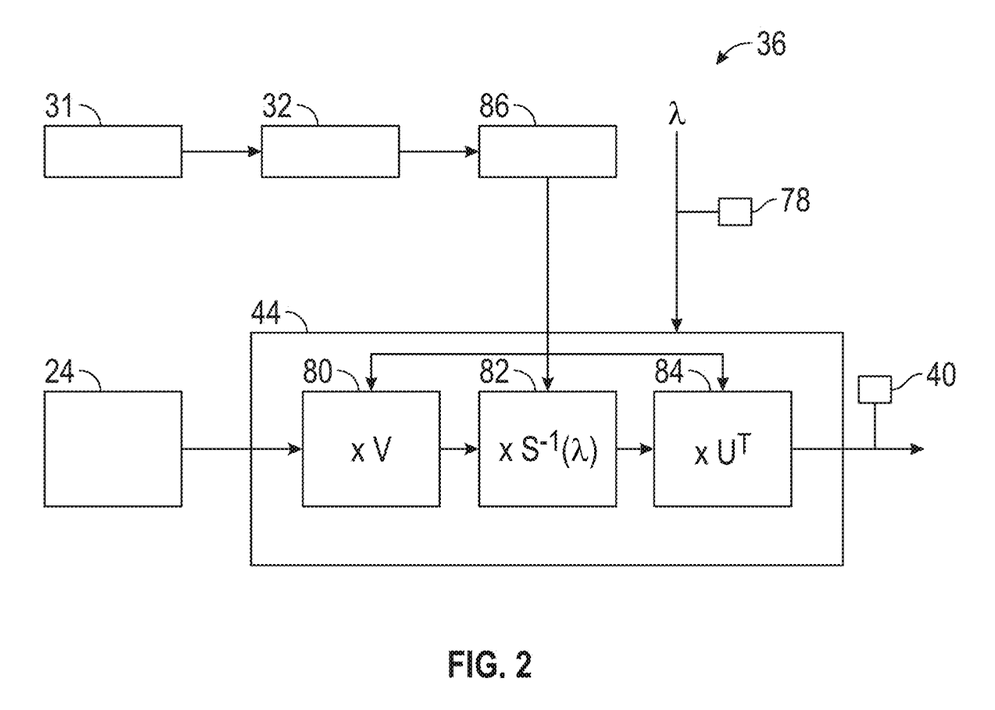
FIG. 2 is a functional block diagram of data processes in a regularized deconvolution sub-module, in accordance with an exemplary embodiment.

FIG. 2 illustrates an exemplary data flow diagram for a regularized deconvolution function 44 used by regularized deconvolution sub-module 36. Regularized deconvolution function 44 is, in this case, a Tikhonov regularized deconvolution function. Following FIG. 2, the PSF module 28 generates the PSF data 31 representing the PSF, which is transformed into the blur matrix $K_B$ defined by the blur matrix 32, as described above. The blur matrix 32 is subject to a single value decomposition (SVD) in order to generate USV decomposition matrices according to equation 7:

$$K_B = USV^T \quad \text{(equation 7)}$$

The inverse of the regularized blur matrix is found to be:

$$[K_B]_{REG}^{-1} = VS(S^2 + \lambda^2 I)^{-1} U^T \quad \text{(equation 8)}$$

where I (unblurred version of blurred input image 24) is:

$$I \approx I_B [K_B]_{REG}^{-1} \quad \text{(equation 9)}$$

and $I_B$ is the blurred input image 24.

Continuing to refer to FIG. 2, the regularized deconvolution function 44 is made up by inverse decomposed matrices 80, 82, 84 as a result of an SVD and inversion operation on the blur matrix $K_B$. Matrix 82 is a function of the regularization parameter $\lambda$ 78 and is of the form $S(S^2 + \lambda^2 I)^{-1}$. The regularization parameter 78 may be a constant for a particular system 10. The blurred input image 24 is multiplied by the decomposition matrices 80, 82, 84 as part of the regularized Tikhonov deconvolution function 44 to thereby provide a deconvolved image 40. Other deconvolution functions are known and may be applicable such as a Wiener regularized deconvolution function.

Referring back to FIG. 1, the deconvolved image 40 may have image artifacts as an inherent result of the regularized deconvolution process. For that reason, the deblurring module 34 may include a Convolutional Neural Network (CNN) sub-module (not shown) or some other artifact removal sub-module that removes any image artifacts in the deconvolved image 40. After any further image artifact removal processing, the deblurring module 34 outputs deblurred output image 20 based on deconvolved image 40.

Figure 3:
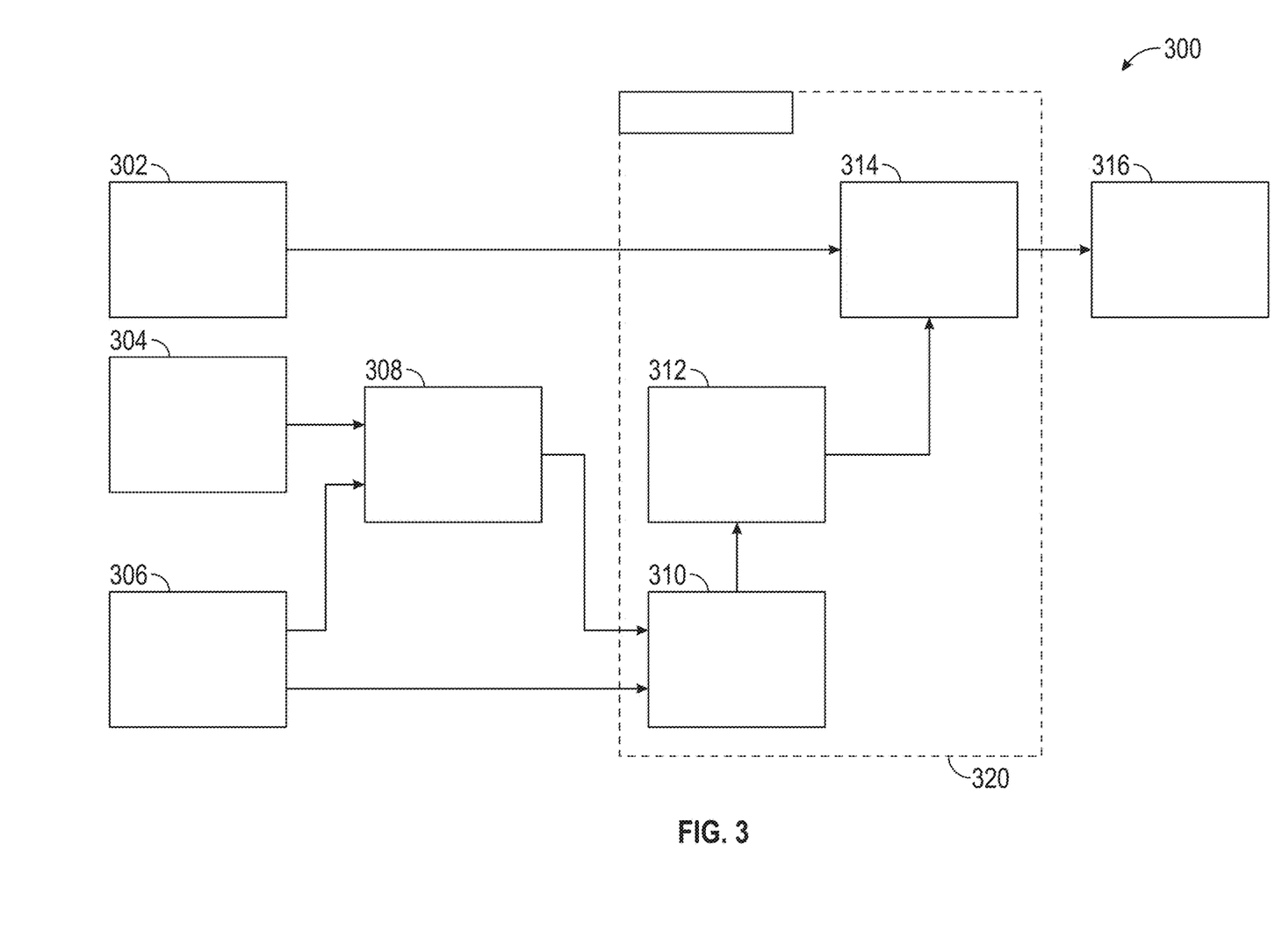
FIG. 3 is a functional block diagram of data processes in a method for motion artifact image deblurring in the case of linear motion and a side looking imaging device, in accordance with an exemplary embodiment.
Figure 4:
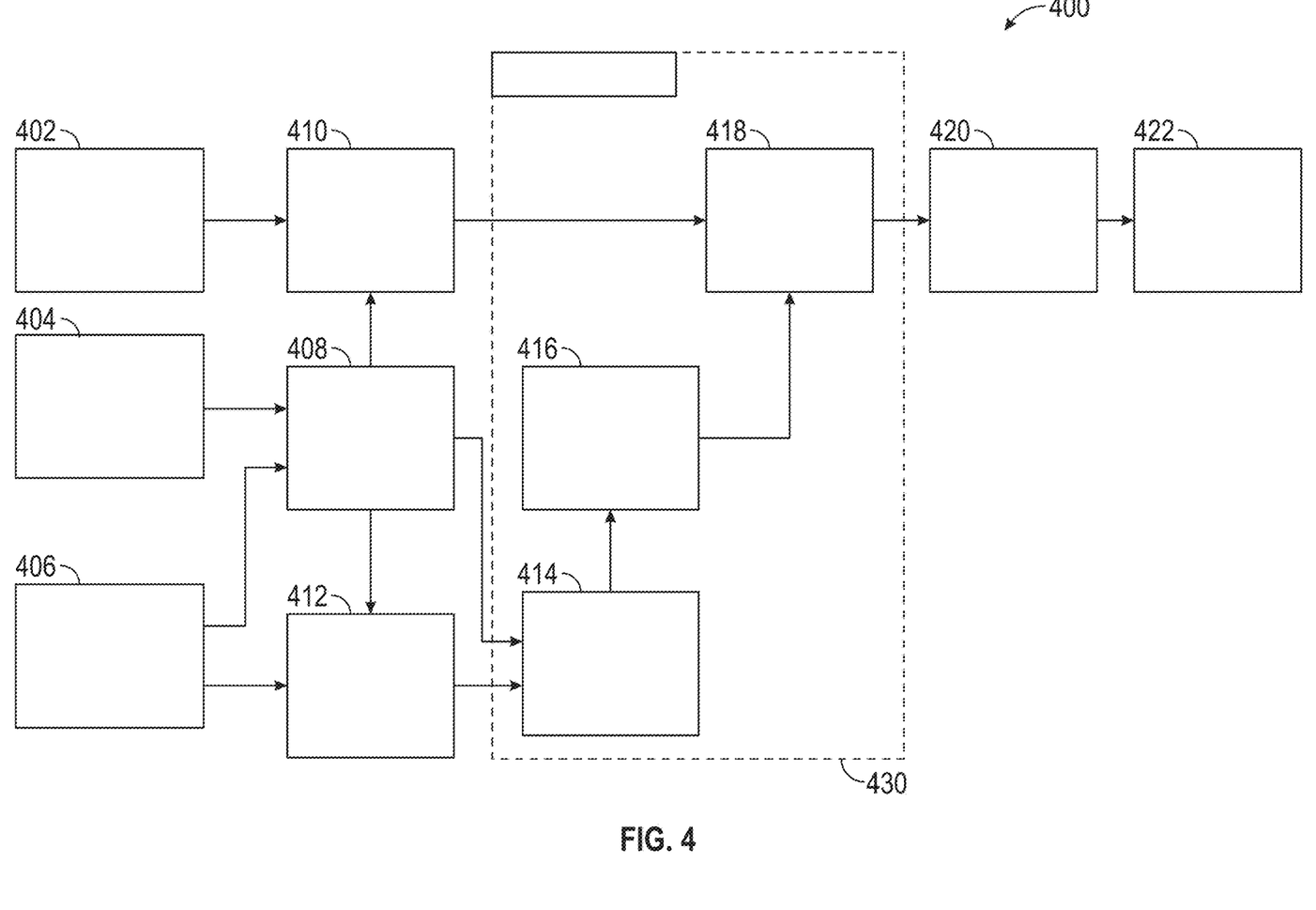
FIG. 4 is a functional block diagram of data processes in a method for motion artifact image deblurring in the case of linear motion and a forward or rearward looking imaging device, in accordance with an exemplary embodiment.
Figure 5:
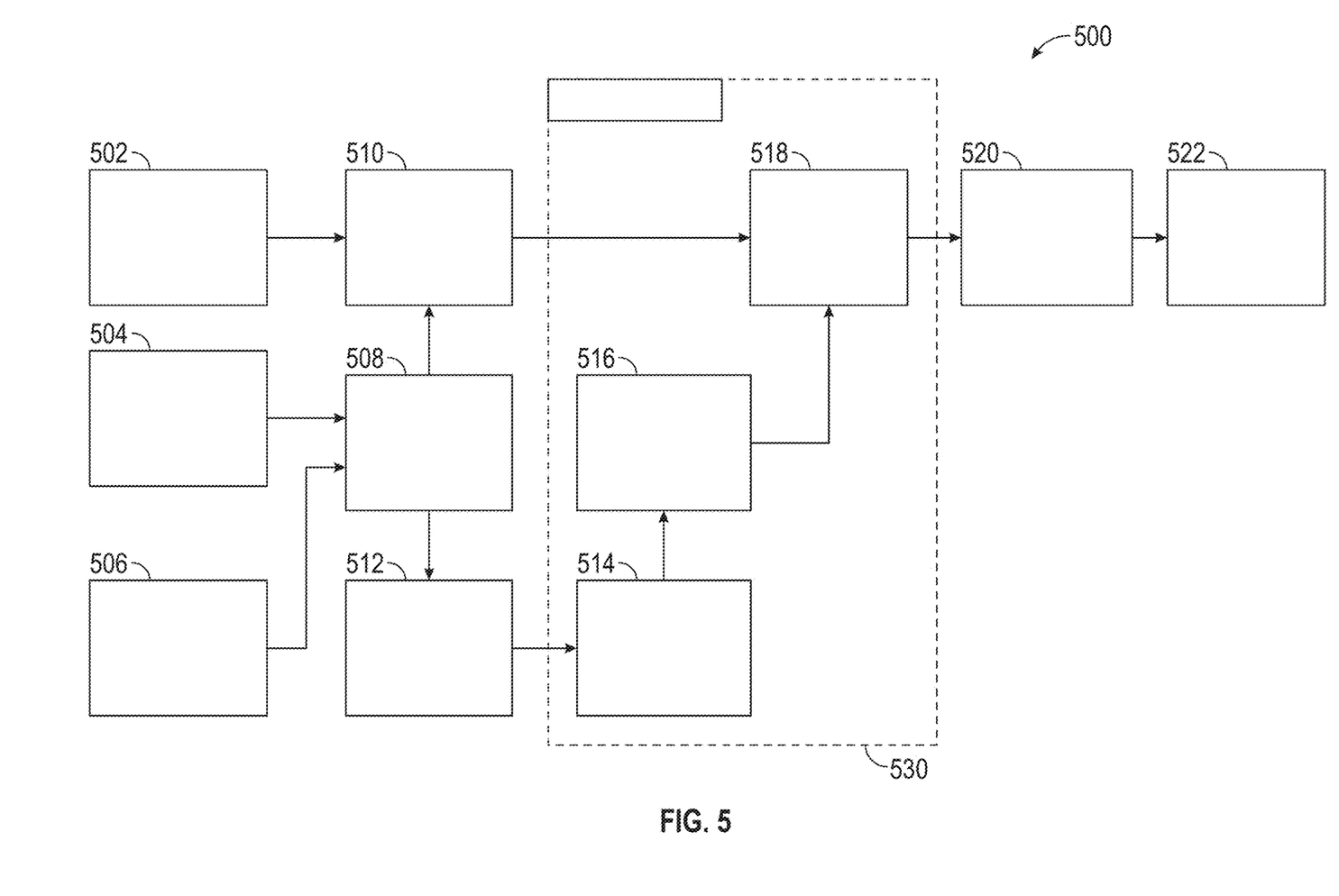
FIG. 5 is a functional block diagram of data processes in a method for motion artifact image deblurring in the general case, in accordance with an exemplary embodiment.

Referring now to FIGS. 3 to 5, and with continued reference to FIGS. 1 and 2, the flowcharts illustrate methods that can be performed by the image processing system 26 of FIG. 1 in accordance with the present disclosure. As can be appreciated in light of the disclosure, the order of operation within the method is not limited to the sequential execution as illustrated in FIGS. 3 to 5, but may be performed in one or more varying orders as applicable and in accordance with the present disclosure. In various embodiments, the methods can be scheduled to run based on one or more predetermined events, and/or can run continuously during operation of the autonomous vehicle 12.

FIG. 3 is a functional block diagram of data processes 300 in a method for motion artifact image deblurring in the case of linear motion and a side looking imaging device 14, in accordance with on embodiment. The data processes 300 may be activated when the image processing system 26 determines, based on vehicle motion data 22, that the vehicle 12 is translating in the y direction (where the direction of facing of the imaging device 14 is in the x direction). In process 302, the blurred input image 24 is obtained by the side looking imaging device 14. In process 304, the vehicle motion data 22 is obtained by vehicle motion sensors 16. In process 306, the depth map data 94 is obtained by the depth sensor 92. In process 308, optical flow lines are estimated. Since the present case is purely translational motion, the optical flow lines are straight lines regardless of the depth of imaged objects and extend in they direction. Accordingly, the results of equation 3 are embodied in PSF data 31, which implicitly estimates magnitude of optical flow lines for the blurred input image 24. Process 308 estimates the optical flow lines by calculating the results of equation 3 based on vehicle velocity, exposure time and the depth map. Process 310 calculates the blur matrix 32 according to equation 5 above. Process 312 uses the deconvolution function 44 to deconvolve the blur matrix 32 into a regularized deblur matrix. In process 314, the regularized deblur matrix from process 312 is applied to the blurred input image from process 302 so that the deblurred output image 20 is output in process 316.

In embodiments, some of the processes 300 are performed row by row, thereby facilitating simplified one dimensional image processes. That is data processes 310, 312 and 314 in box 320 are performed for each row. A single row of image data is read from blurred input image 24 (which is two dimensional in rows and columns). The blur matrix and the regularized deblur matrix are calculated in steps 310, 312 in one dimension (e.g. for a single row) based on depth information for the single row of the blurred input image 24. In this way, the one dimensional Tikhonov regularized deconvolution function 44 described above is used in process 312. The regularized deblur matrix from process 312 is applied to the single row of image data of the blurred input image in order to produce a single row of output data. The processes 310, 312 and 314 are repeated for each row of the blurred input image 24. The rows of deblurred output image data are combined and output in process 316, to thereby provide the deblurred output image 20.

Figure 6:
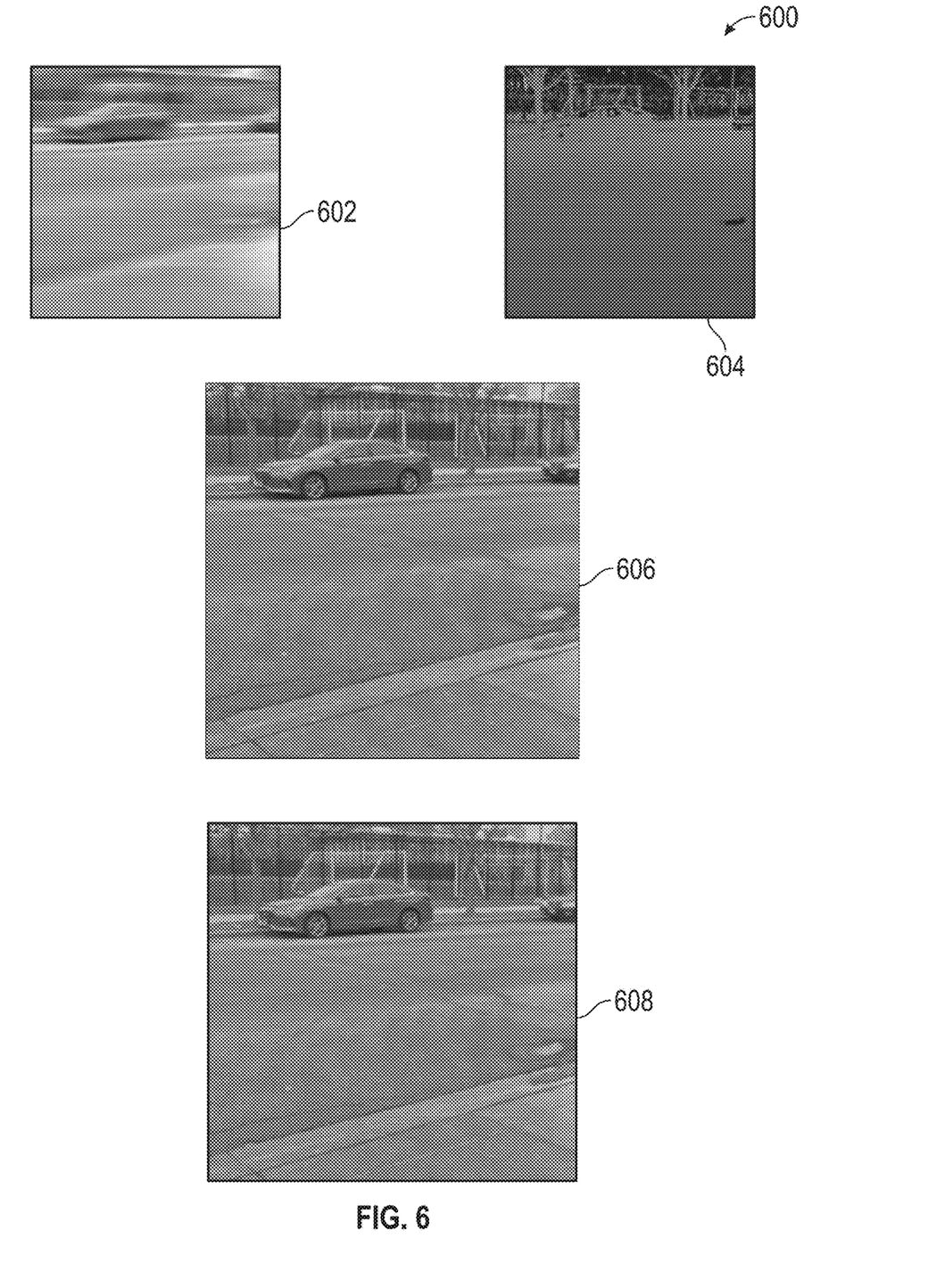
FIG. 6 shows image transformations during simulation of motion artifact deblurring in the case of a side looking camera, in accordance with an exemplary embodiment.

FIG. 6 shows images 600 produced during simulation of motion artifact deblurring according to the data processes of FIG. 3 in the case of a side looking camera and translational motion, in accordance with an exemplary embodiment. A blurred input image 602 includes blurring in the u direction of image space, which corresponds to the direction of translational movement of the vehicle 12. The images 600 include a depth map 604 corresponding (in terms of dimensions and positionally) to the blurred input image 602. According to the processes 300 of FIG. 3, the PSF is calculated for each row of the blurred input image 602 using respective rows of the depth map 604, thereby implicitly estimating a magnitude of optical flow lines in the row or u direction according to process 308. From the PSF, the regularized deblur matrix is calculated using the PSF and processes 310 and 312, which is applied to one of the rows of the blurred input image 602 in process 314. These processes 310, 312 and 314 are repeated to produce the deblurred output image 606. Image 608 shows the ground truth for the purposes of comparison with the deblurred output image 606. As can be seen by comparing blurred input image 602 and deblurred output image 606 in FIG. 6, efficient, one dimensional, image processing steps have been used to create a sharp image.

FIG. 4 is a functional block diagram of data processes 400 in a method for motion artifact image deblurring in the case of linear motion and a forward or rearward looking imaging device 14, in accordance with on embodiment. Data processes 400 may be activated when the image processing system 26 determines, based on vehicle motion data 22, that the vehicle 12 is translating in the y direction (where the direction of facing of the imaging device 14 is also in the y direction). In translational forward or rearward motion and using a forward or rearward imaging device 14 aligned with the translational motion of the vehicle 12, the optical flow aligns with a set of straight lines converging at a Focus Of Expansion (FOE) of the imaging device 14. FOE may, but does not have to, coincide with the center of the image captured by the imaging device 14. The location depends on the orientation of the imaging device 14 with respect to the vehicle motion.

In process 402, the blurred input image 24 is obtained by the forward or rearward looking imaging device 14. In process 404, the vehicle motion data 22 is obtained by the vehicle motion sensors 16. In process 406, the depth map data 94 is obtained by the depth sensor 92. In process 410, the blurred input image 24 is resampled from cartesian coordinates to polar coordinates with the FOE as the center. In the present example, the motion induced blurring occurs in the radial direction only (along lines of constant 9) along lines converging at the FOE of the imaging device 14. By converting the blurred input image into polar coordinates, the motion blurring is aligned along the u direction in image space such that the foregoing equations 2 to 9 remain applicable. That is, by resampling the blurred input image 24, the problem of motion deblurring using depth information has been made tractable by the foregoing, one-dimensional, approach. In process 412, the depth map defined by the depth map data 94 is resampled to polar coordinates with the FOE as the center for similar reasons to that outlined above.

In process 408, optical flow lines are estimated. Since the present case is purely translational motion, the optical flow lines are straight lines regardless of the depth of imaged objects and extend in the radial direction. Accordingly, the results of equation 3 are embodied in the PSF data 31, which implicitly estimates a magnitude of optical flow lines for the blurred input image 24. Process 408 estimates the optical flow lines by calculating the results of equation 3 based on the vehicle velocity, the exposure time and the depth map. Process 410 calculates the blur matrix 32 according to equation 5 above. According to process 410, the PSF is defined with respect to the resampled depth map. That is, the PSF uses values of the resampled depth map at each coordinate [m, n] (or pixel number) of the resampled depth map. As a result of the resampling process, u and v coordinates in the depth map and in the blurred input image 24 are aligned with r (radial extent) and 9 (polar angle). Process 412 uses the deconvolution function 44 to deconvolve the blur matrix 32 into a regularized deblur matrix. In process 414, the regularized deblur matrix from process 412 is applied to the resampled input image from process 410 to produce a polar coordinates deblurred output image. In process 420, the polar coordinates deblurred output image is resampled or transformed to cartesian coordinates so that deblurred output image 20 is output in process 422.

Similar to that described with respect to FIGS. 3 and 4, some of the processes 400 are performed row by row, thereby facilitating simplified one dimensional image processes. That is, the data processes 414, 416 and 418 in box 430 are repeated for each single row of the resampled input image from process 410 and of the resampled depth map from process 412.

Figure 7:
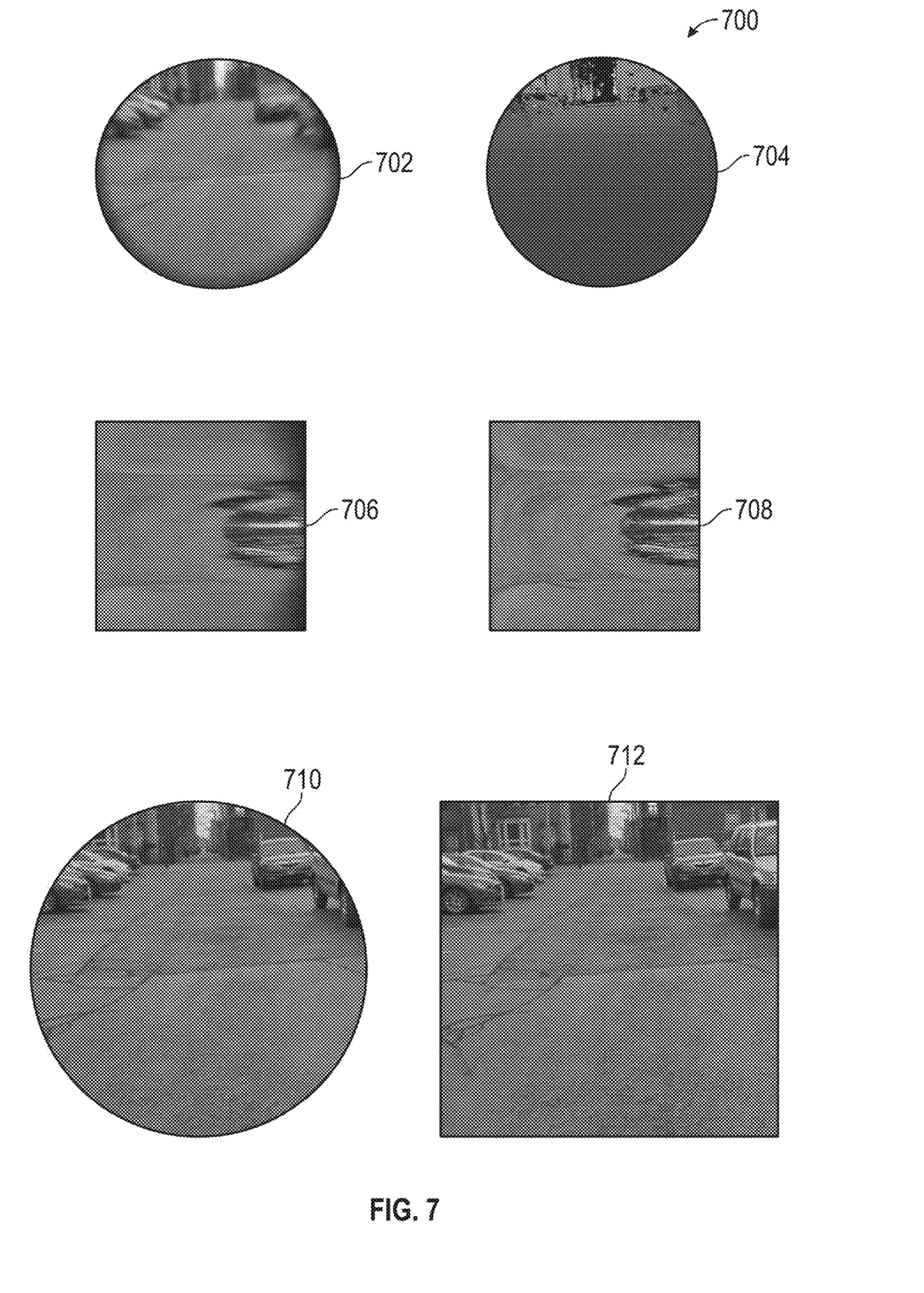
FIG. 7 shows image transformations during simulation of motion artifact deblurring in the case of a forward or rearward looking camera, in accordance with an exemplary embodiment.

FIG. 7 shows images 700 produced during simulation of motion artifact deblurring according to the data processes of FIG. 4 in the case of a forward or rearward looking camera and translational motion, in accordance with an exemplary embodiment. A blurred input image 702 includes deblurring in the r direction of image space along lines of constant 6' converging at the FOE of the imaging device 14. The images 700 include a depth map 704 corresponding (in terms of dimensions, positionally and the FOE) to the blurred input image 702.

According to processes 410 and 412 of FIG. 4, the blurred input image 702 and the depth map 704 are resampled into polar coordinates so as to produce the resampled input image 706 and the resampled depth map 708 shown in FIG. 7. In processes 408 and 414, values of the resampled depth map 704 are used to determine the point spread function and the blur matrix, which implicitly estimates the magnitude of optical flow lines. In process 416, the blur matrix from process 416 is applied to one of the rows of the blurred input image 702. The regularized deblur matrix is calculated on a row by row basis in process 416 based on one row of the depth map 704, which is then applied to a corresponding single row of the blurred input image 702 in processes 414, 416 and 418. These processes 414, 416 and 418 are repeated for all of the rows of the input image 702 and the depth map 704 to produce a polar coordinates deblurred output image, which is then resampled into cartesian coordinates in process 420 to produce the deblurred output image 710. Image 712 shows the ground truth image and closely corresponds in sharpness to the deblurred output image 710. As can be seen by comparing the blurred input image 702 and the deblurred output image 710 in FIG. 7, efficient, one dimensional, image processing steps have been used to create a sharp image, substantially free of motion induced blurring.

FIGS. 3 and 4 describe data processes for motion artifact image deblurring in specific examples of translational motion for side and forward/rearward looking cameras, respectively, in accordance with exemplary embodiments. The embodiments of FIGS. 3 and 4 are, in themselves, practical and cover a wide range of use case scenarios for vehicles. However, a more general approach can be derived from the same principles that does not rely on assumptions concerning translational motion and specific camera orientations. FIG. 5 illustrates data processes 500 of a method for image deblurring according to a more general, exemplary embodiment. The data processes of FIG. 5 are applicable for mixed (rotation plus translation) motion of the vehicle 12. When there is mixed motion of the vehicle 12, the direction of the optical flow lines and the magnitude of the optical flow depend on the depth and will locally vary throughout the blurred input image 24. This is to be contrasted with the case of translational motion of the vehicle 12 where the direction of the optical flow lines is consistent through the blurred input image 24 and only the magnitude varies depending on depth.

Data processes 500 may be activated when the image processing system 26 determines, based on vehicle motion data 22, that the vehicle 12 has significant motion contributions translationally and rotationally. It should be noted that for purely rotational motion, the optical flow does not depend on the depth and thus does not need to be corrected by the depth adaptive motion deblurring systems and methods described herein.

In process 502, the blurred input image 24 is obtained by the imaging device 14. In process 504, the vehicle motion data 22 is obtained by the vehicle motion sensors 16. The vehicle motion data includes three-dimensional velocity and acceleration information in the present embodiment. In process 506, the depth map data 94 is obtained by the depth sensor 92. In process 508, optical flow is estimated. In contrast to the processes of FIGS. 3 and 4, optical flow is explicitly estimated rather than this step being implicitly performed. Optical flow can be determined by:

$$\dot{p} = \frac{1}{Z} \begin{Bmatrix} xV_z - V_x \\ yV_z - V_y \end{Bmatrix} + \begin{Bmatrix} xy & -(1+x^2) & y \\ (1+y^2) & -xy & -x \end{Bmatrix} \Omega \quad \text{(equation 10)}$$

where x and y represent the normalized three-dimensional coordinates of an image feature in the real word:

$$x = \frac{X}{Z}, y = \frac{Y}{Z}$$

X, Y, and Z are regular three-dimensional coordinates of an image feature in the real word, $V_x$ $V_y$ $V_z$ are the velocity vector components along each of the axes x, y and z and:

$$\Omega = (\Omega_X \Omega_Y \Omega_Z)^T \quad \text{(equation 11)}.$$

$\Omega$ is the angular velocity vector, which is obtained from vehicle motion data 22, specifically acceleration data obtained from an Inertial Measurement Unit (IMU) included in vehicle motion sensors 16.

Process 508 provides a map of optical flow including magnitude and direction of optical flow lines at each coordinate. Optical flow may vary locally throughout the map of optical flow. In process 510, the blurred input image 24 is resampled from cartesian coordinates along the optical flow lines based on the estimated optical flow obtained in process 508. This resampling step includes resampling to local coordinate frames according to the optical flow lines at each pixel of the burred input image. In process 512, the optical flow (the map of optical flow) itself, which has been obtained in process 508, is resampled along the optical flow lines.

Process 514 calculates the blur matrix 32 according to equation 5 above. According to process 514, the PSF is defined with respect to the resampled optical flow map obtained from process 512. That is, the PSF uses values of the resampled optical flow map at each coordinate [m, n] (or pixel number) thereof. The resampling process has enabled complex optical flow in the blurred input image 24 and in the optical flow map to be aligned one dimensionally (in the u direction of image space) such that the one dimensional deblurring equations described above remain operational. Process 516 uses the deconvolution function 44 to deconvolve the blur matrix 32 into a regularized deblur matrix. In process 518, the regularized deblur matrix from process 516 is applied to the resampled input image from process 510 to produce a polar coordinates deblurred output image. In process 520, the optical flow coordinates deblurred output image is resampled to cartesian coordinates so that the deblurred output image 20 is output in process 522.

Similar to that described with respect to FIGS. 3 and 4, some of the processes 500 are performed row by row, thereby facilitating simplified one dimensional image processes. That is, the data processes 514, 516 and 518 in box 530 are repeated for each single row of the resampled input image from process 510 and the resampled optical flow map from process 512.

Thus, for the most general case, the optical flow is calculated in cartesian coordinates using equations 10 and 11 above. Then, the optical flow itself is resampled along the optical flow lines. In this way, the optical flow is aligned with the resampled input image and the deblurring can proceed independently for each row of the resampled image. Since the deblurring cycle proceeds row by row in the embodiments described herein with respect to FIGS. 3 to 5, it can be effectively parallelized on more than one processor 70.

In embodiments of the present disclosure, the deblurred output image 20 is output by the image processing system 26 and received by the vehicle controller 18. The vehicle controller 18 generates control instructions 90 based on the deblurred output image. The control instructions 90 are output to the vehicle actuators 96 for controlling one or more functions of the vehicle 12 such as steering, braking and propulsion.

It will be appreciated that the disclosed methods, systems, and vehicles may vary from those depicted in the Figures and described herein. For example, the vehicle 12 and the image processing system 26 and/or various components thereof may vary from that depicted in FIGS. 1 and 2 and described in connection therewith. In addition, it will be appreciated that certain steps of the methods may vary from those depicted in FIGS. 3 to 5. It will similarly be appreciated that certain steps of the method described above may occur simultaneously or in a different order than that depicted in FIGS. 3 to 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof

What is claimed is:

1. A method of image deblurring in a vehicle, the method comprising:
receiving, via at least one processor, a blurred input image from an imaging device;
receiving, via the at least one processor, vehicle motion data from at least one vehicle motion sensor;
receiving, via the at least one processor, a depth map corresponding to the blurred input image from a depth sensor;
determining, via the at least one processor, a point spread function based on the vehicle motion data and the depth map;
calculating, via the at least one processor, a deblur matrix based on the point spread function;
deblurring, via the at least one processor, the blurred input image based on the deblur matrix and the blurred input image to thereby provide a deblurred output image; and
controlling, via the at least one processor, a function of the vehicle based on the deblurred output image.

2. The method of claim 1, comprising calculating a blur matrix based on the point spread function and calculating a regularized deblur matrix, which corresponds to the deblur matrix, based on the blur matrix and using a deconvolution function.

3. The method of claim 2, wherein the deconvolution function is a Tikhonov-regularized deconvolution function.

4. The method of claim 1, wherein the point spread function represents a smear extent in image space of each pixel of the blurred input image caused by motion of a real world scene relative to the imaging device as a result of vehicle motion, wherein each pixel in two dimensional image space of the blurred input image has at least one corresponding location in the real world scene, wherein the vehicle motion is defined by the vehicle motion data, wherein the smear extent in image space of each pixel of the blurred input image is inversely proportional to a depth of the at least one corresponding location in real world space, and wherein the depth in real world space is defined by the depth map.

5. The method of claim 1, wherein the imaging device is a side looking camera of the vehicle,
the method further comprising, in a case of translational vehicle motion:
estimating, via the at least one processor, a magnitude of optical flow lines based on the depth map and the vehicle motion data;
determining, via the at least one processor, the point spread function based on the magnitude of the optical flow lines;
calculating, via the at least one processor, a blur matrix based on the point spread function;
calculating, via the at least one processor, a regularized deblur matrix based on the blur matrix and using a deconvolution function; and
deblurring, via the at least one processor, the blurred input image based on the regularized deblur matrix and the blurred input image to thereby provide the deblurred output image.

6. The method of claim 1, wherein the imaging device is a forward looking or rearward looking camera of the vehicle,
the method further comprising, in a case of translational vehicle motion:
resampling, via the at least one processor, the blurred input image and the depth map to polar coordinates converging at a focus of expansion of the imaging device;

estimating, via the at least one processor, a magnitude of optical flow lines based on the vehicle motion data;

determining, via the at least one processor, the point spread function based on the magnitude of the optical flow lines;

calculating, via the at least one processor, a blur matrix based on the point spread function and the resampled depth map;

calculating, via the at least one processor, a regularized deblur matrix based on the blur matrix and using a deconvolution function;

deblurring, via the at least one processor, the blurred input image based on the regularized deblur matrix and the resampled blurred input image to thereby provide a polar coordinates deblurred image; and resampling the polar coordinates deblurred image into cartesian coordinates to thereby provide the deblurred output image.

7. The method of claim 1, comprising:

estimating, via the at least one processor, magnitude and direction of optical flow lines in cartesian coordinates based on the depth map and the vehicle motion, thereby estimating optical flow;

resampling, via the at least one processor, the optical flow from the cartesian coordinates along the optical flow lines;

resampling, via the at least one processor, the blurred input image from cartesian coordinates along the optical flow lines;

determining, via the at least one processor, the point spread function based on the vehicle motion and the resampled optical flow;

calculating, via the at least one processor, a blur matrix based on the point spread function;

calculating, via the at least one processor, a regularized deblur matrix based on the blur matrix and using a deconvolution function;

deblurring, via the at least one processor, the blurred input image based on the regularized deblur matrix and the resampled blurred input image to thereby provide an optical flow coordinates deblurred image; and resampling, via the at least one processor, the optical flow coordinates deblurred image into cartesian coordinates to thereby provide the deblurred output image.

8. The method of claim 1, wherein the steps of determining the point spread function, calculating the deblur matrix, and deblurring the blurred input image are performed on a single row and for each row of the blurred input image.

9. A system for image deblurring in a vehicle, the system comprising:

an imaging device;
a vehicle controller;
a depth sensor; and
at least one processor configured to execute program instructions, wherein the program instructions are configured to cause the at least one processor to:
receive a blurred input image from the imaging device;
receive vehicle motion data;
receive a depth map corresponding to the blurred input image from the depth sensor;
determine a point spread function based on the vehicle motion data and the depth map;
calculate a deblur matrix based on the point spread function; and
deblur the blurred input image based on the deblur matrix and the blurred input image to thereby provide a deblurred output image;
wherein the vehicle controller is configured to control a function of the vehicle based on the deblurred output image.

10. The system of claim 9, wherein the program instructions are configured to cause the at least one processor to calculate a blur matrix based on the point spread function and calculate a regularized deblur matrix, which corresponds to the deblur matrix, based on the blur matrix and using a deconvolution function.

11. The system of claim 10, wherein the deconvolution function is a Tikhonov-regularized deconvolution function.

12. The system of claim 10, wherein the point spread function represents a smear extent in image space of each pixel of the blurred input image caused by motion of a real world scene relative to the imaging device as a result of vehicle motion, wherein each pixel in two dimensional image space of the blurred input image has at least one corresponding location in the real world scene, wherein the vehicle motion is defined by the vehicle motion data, wherein the smear extent in image space of each pixel of the blurred input image is inversely proportional to a depth of the at least one corresponding location in real world space, and wherein the depth in real world space is defined by the depth map.

13. The system of claim 10, wherein the imaging device is a side looking camera of the vehicle,
wherein the program instructions are configured to cause the at least one processor to, in a case of translational vehicle motion:
estimate magnitude of optical flow lines based on the depth map and the vehicle motion data;
determine the point spread function based on the magnitude of the optical flow lines;
calculate, the blur matrix based on the point spread function;
calculate the regularized deblur matrix based on the blur matrix and using the deconvolution function; and
deblur the blurred input image based on the regularized deblur matrix and the blurred input image to thereby provide the deblurred output image.

14. The system of claim 10, wherein the imaging device is a forward looking or rearward looking camera of the vehicle,
wherein the program instructions are configured to cause the at least one processor to, in a case of translational vehicle motion:
resample the blurred input image and the depth map to polar coordinates converging at a focus of expansion of the imaging device;
estimate magnitude of optical flow lines based on the resampled depth map and the vehicle motion data;
determine the point spread function based on the magnitude of the optical flow lines;
calculate the blur matrix based on the point spread function;
calculate the regularized deblur matrix based on the blur matrix and using the deconvolution function;
deblur the blurred input image based on the regularized deblur matrix and the resampled blurred input image to thereby provide a polar coordinates deblurred image; and resample the polar coordinates deblurred image into cartesian coordinates to thereby provide the deblurred output image.

15. The system of claim 10, wherein the program instructions are configured to cause the at least one processor to:
estimate magnitude and direction of optical flow lines in cartesian coordinates based on the depth map and the vehicle motion, thereby estimating optical flow;
resample the optical flow from the cartesian coordinates along the optical flow lines;
resample the blurred input image from cartesian coordinates along the optical flow lines;
determine the point spread function based on the vehicle motion and the resampled optical flow;
calculate the blur matrix based on the point spread function;
calculate the regularized deblur matrix based on the blur matrix and using the deconvolution function;
deblur the blurred input image based on the regularized deblur matrix and the resampled blurred input image to thereby provide an optical flow coordinates deblurred image; and
resample the optical flow coordinates deblurred image into cartesian coordinates to thereby provide the deblurred output image.

16. The system of claim 10, wherein the steps of determining the point spread function, calculating the deblur matrix, and deblurring the blurred input image are performed on a single row and for each row of the blurred input image.

17. A vehicle, comprising:
an imaging device;
a vehicle controller;
vehicle actuators;
at least one vehicle motion sensor;
a depth sensor; and
at least one processor configured to execute program instructions, wherein the program instructions are configured to cause the at least one processor to:
receive a blurred input image from the imaging device;
receive vehicle motion data from the at least one vehicle motion sensor;
receive a depth map corresponding to the blurred input image from the depth sensor;
determine a point spread function based on the vehicle motion data and the depth map;
calculate a deblur matrix based on the point spread function; and
deblur the blurred input image based on the deblur matrix and the blurred input image to thereby provide a deblurred output image;
wherein the vehicle controller is configured to control a function of the vehicle, via the vehicle actuators, based on the deblurred output image.

18. The vehicle of claim 17, wherein the program instructions are configured to cause the at least one processor to calculate a blur matrix based on the point spread function and calculate a regularized deblur matrix, which corresponds to the deblur matrix, based on the blur matrix and using a deconvolution function.

19. The vehicle of claim 17, wherein the program instructions are configured to cause the at least one processor to:
estimate magnitude and direction of optical flow lines in cartesian coordinates based on the depth map and the vehicle motion, thereby estimating optical flow;
resample the optical flow from the cartesian coordinates along the optical flow lines;
resample the blurred input image from cartesian coordinates along the optical flow lines;
determine the point spread function based on the vehicle motion and the resampled optical flow;
calculate a blur matrix based on the point spread function;
calculate a regularized deblur matrix based on the blur matrix and using a deconvolution function;
deblur the blurred input image based on the regularized deblur matrix and the resampled blurred input image to thereby provide an optical flow coordinates deblurred image; and
resample the optical flow coordinates deblurred image into cartesian coordinates to thereby provide the deblurred output image.

20. The vehicle of claim 17, wherein the steps of determining the point spread function, calculating the deblur matrix, and deblurring the blurred input image are performed on a single row and for each row of the blurred input image.

* * * * *